United States Patent
Gates

(10) Patent No.: US 7,512,399 B2
(45) Date of Patent: Mar. 31, 2009

(54) MOBILE TELECOMMUNICATIONS DEVICE

(75) Inventor: Jacqui Gates, Reading (GB)

(73) Assignee: Nokia Corporation, Espoo (FI)

( * ) Notice: Subject to any disclaimer, the term of this patent is extended or adjusted under 35 U.S.C. 154(b) by 332 days.

(21) Appl. No.: 10/060,385

(22) Filed: Feb. 1, 2002

(65) Prior Publication Data

US 2002/0128047 A1    Sep. 12, 2002

(30) Foreign Application Priority Data

Feb. 2, 2001    (GB)    ................. 0102680.6

(51) Int. Cl.
*H04L 12/58*    (2006.01)

(52) U.S. Cl. ................. 455/412.1; 455/412.2; 455/460; 455/461; 455/466

(58) Field of Classification Search ............. 455/412.1, 455/412.2, 460, 461, 466, 458, 566, 417, 455/564

See application file for complete search history.

(56) References Cited

U.S. PATENT DOCUMENTS

| | | | | |
|---|---|---|---|---|
| 5,809,415 | A * | 9/1998 | Rossmann | ............... 455/422.1 |
| 5,920,826 | A * | 7/1999 | Metso et al. | ................ 455/557 |
| 5,923,327 | A * | 7/1999 | Smith et al. | ................ 345/784 |
| 6,005,928 | A * | 12/1999 | Johnson | ................ 379/142.01 |
| 6,119,155 | A * | 9/2000 | Rossmann et al. | .......... 709/219 |
| 6,192,258 | B1 * | 2/2001 | Kamada et al. | ............. 455/566 |
| 6,314,094 | B1 * | 11/2001 | Boys | .......................... 370/352 |
| 6,321,257 | B1 * | 11/2001 | Kotola et al. | ................ 709/219 |
| 6,570,596 | B2 | 5/2003 | Frederiksen | |
| 6,842,612 | B2 * | 1/2005 | Kalish et al. | ............. 455/414.2 |
| 2004/0229595 | A1 * | 11/2004 | Laursen et al. | ............. 455/403 |

FOREIGN PATENT DOCUMENTS

| | | |
|---|---|---|
| EP | 0946028 | 9/1999 |
| EP | 1 128 647 A2 | 8/2001 |
| EP | 1130890 | 9/2001 |
| JP | 10327231 | 12/1998 |
| JP | 2000270080 | 9/2000 |

OTHER PUBLICATIONS

Kapitel 4: Einführung in die Hauptdatenbanken, 1999 Sybex-Verlag Gmbh, Düsseldorf, pp. 113-116 and 132.
"Mastering Lotus Notes R5", Scot Haberman, et al., Chapter 4—Introducing the Core Databases; 1999 Sybex, Inc., 41 pages.

* cited by examiner

*Primary Examiner*—Minh D Dao
(74) *Attorney, Agent, or Firm*—Banner & Witcoff, Ltd.

(57) ABSTRACT

A method of controlling a mobile telecommunications device (1) is disclosed. The device (1) includes a memory (18) for storing a list of contacts each having an e-mail address associated therewith and a keypad (4) including a short-cut key (13), the method comprises the steps of accessing the list of contacts stored in the memory (18); selecting a contact from said list; accessing a screen for composing an e-mail message having a recipient address field by activating the short-cut key (13), wherein activation of said key (13) also enters the e-mail address of said selected contact in the recipient address field; composing an e-mail message; and activating the short cut key to send said message to the address entered in the recipient address field.

6 Claims, 5 Drawing Sheets

MOBILE TELECOMMUNICATIONS DEVICE

FIELD OF THE INVENTION

The present invention relates to a method of operating a mobile telecommunications device and, in particular, to a method of operating a mobile telephone and a mobile telephone configured to operate according to the method.

BACKGROUND TO THE INVENTION

A mobile telephone incorporates a liquid crystal display to provide its user with information concerning the status of the telephone and a keypad including several "soft keys" and "call-handling keys" which are operable in various combinations to activate a large number of different functions.

As mobile telephones become more advanced, they are capable of performing more functions. For example, in addition to making a telephone call, it is now also possible to use a mobile telephone to send and receive e-mail messages and to access the internet. As a result, mobile telephones become more complicated to use as the number of different functions accessible using each soft key and/or call handling keys increases, as does the number of times that a particular key or series of keys must be pressed to perform a particular function. This makes the telephone much slower to operate and can make it confusing and more difficult to use. For example, when a user wishes to send an e-mail, they must first highlight the recipients name from a list of contacts and activate a key to call up a screen showing detailed contact information for the chosen recipient. The recipients e-mail address must then be highlighted and a key activated to display a menu of options, one of which is "send e-mail". Selection of this option by activating a key displays a window with the recipients e-mail address. The user then composes their e-mail message in the same text string following the displayed e-mail address. When the message is complete, operation of a key displays a "send" option. If this option is selected, a prompt is given to enter a telephone number. The message can be sent following entry of the telephone number by operating another key. Therefore, in this example, the e-mail address becomes part of a text message (SMS). The message is sent to a server which views the text message, strips off the e-mail address and sends the message to the e-mail address. In another example, when a user wishes to send an e-mail, the option "write mail" must be highlighted from a list of e-mail related options and a key activated to display a "compose message" window. The user can then compose their message and activate a key to display a contact list from which they can select the chosen recipient. Once selected, the recipient's e-mail address is entered in the "To" box of the composed e-mail message.

It will be appreciated from the foregoing examples, that the procedure that must be followed to send an e-mail is time consuming and laborious as a relatively large number of different key presses are required in addition to those required to compose the message. Furthermore, in the second example, it is not possible to choose the message recipient and display their e-mail address in the "compose message" window before composing the message.

SUMMARY OF THE INVENTION

It is one object of the present invention to overcome or substantially alleviate the problems associated with conventional mobile telephones discussed above.

According to a first aspect of the present invention, there is provided a method of controlling a mobile telecommunications device including a memory for storing a list of contacts each having an e-mail address associated therewith and a keypad including a short-cut key, the method comprising the steps of:

a) accessing the list of contacts stored in the memory;
b) selecting a contact from said list;
c) accessing a screen for composing an e-mail message having a recipient address field by activating the short-cut key, wherein activation of said key also enters the e-mail address of said selected contact in the recipient address field;
d) composing an e-mail message; and
e) activating the short cut key to send said message to the address entered in the recipient address field. This method is advantageous as the user is presented with a "compose message" window with the recipients address displayed in the recipient address field directly following activation of the short-cut key after selecting a contact from the list of contacts stored in the memory. This reduces the number of key presses required to send an e-mail message and makes the device easier to operate.

In one embodiment, the step of accessing a screen for composing an e-mail message (step c), includes the step of:

f) activating the short cut key to display contact details, including an e-mail address, associated with the selected contact, and
g) selecting the e-mail address before activating the short cut key again to access the screen for composing an e-mail message with the e-mail address of the selected contact entered in the recipient address field. Although, in this embodiment, the e-mail address must be selected from the contact details of a selected contact, the screen for composing an e-mail address with the recipient's e-mail address entered in the recipient address field is accessed directly following activation of the short-cut key after selecting the e-mail address. Therefore, the step of selecting a "send e-mail" option from a list of e-mail options is avoided.

In a second aspect of the present invention, there is provided a method of controlling a mobile telephone, including a memory for storing a list of contacts each having a telephone number associated therewith and a keypad including a short cut key, the method including the steps of:

a) accessing the list of contacts stored in the memory;
b) selecting a contact from the list;
c) activating the short cut key to access a screen for composing a text message (SMS) having a field for entry of the recipients telephone number and/or name, wherein activation of said short cut key also enters the selected telephone number and/or name of the selected contact in the telephone number and/or name field;
d) composing a text message (SMS); and
e) activating a key to send said message to the selected telephone number and/or name in the telephone number and/or name field. This method is advantageous as the user is presented with a "compose text message" screen with the recipients telephone number and/or name displayed in the telephone number and/or name field directly following activation of the short-cut key after selecting a contact from the list of contacts stored in the memory. This reduces the number of key presses required to send a text message and makes the mobile telephone easier to operate.

In a one embodiment, the step of accessing a screen for composing a text message (step c), includes the step of:

f) activating the short cut key to display contact details, including a telephone number, associated with the selected contact; and g) selecting the telephone number before activating the short cut key again to access the screen for composing a text message with the telephone number and/or name of the selected contact entered in the telephone number and/or name field. Although, in this embodiment, the telephone number must be selected from the contact details of a selected contact, the screen for composing a text message with the recipient's name and/or telephone number entered in the telephone number/name field is accessed directly following activation of the short-cut key following selection of the telephone number. Therefore, the step of selecting a "send text message" option from a list of options is avoided.

Preferably, steps (f) and (g) of both methods are followed only when both an e-mail address and a telephone number are associated with a selected contact.

In a third aspect of the present invention, there is provided a method of controlling a mobile telephone including a memory for storing a list of contacts each having a URL address associated therewith and a keypad including a short-cut key, the method comprising the steps of:

a) accessing the list of contacts stored in the memory;

b) selecting a contact from said list;

c) connecting to the URL by activating the short-cut key. This method is advantageous as the user is connected to the URL directly following activation of the short-cut key after selecting a contact from the list of contacts stored in the memory. This reduces the number of key presses required to connect to a URL and makes the device easier to operate.

In a preferred embodiment, step (b) preferably includes the steps of:

d) activating the short cut key to display contact details, including a URL address, associated with the selected contact; and e) selecting the URL address before activating the short cut key to connect to the URL.

The mobile telephone preferably includes a scroll key and the step of selecting a contact from the list, selecting an e-mail address, selecting a telephone number or a URL address, according to any of the methods of the invention, includes the step of activating the scroll key to highlight a required contact.

Referring to the first aspect of the invention, each contact may have telephone number and/or a URL address associated therewith in addition to the e-mail address, and the short cut key is, preferably, operable to either access a screen for composing an e-mail message, access a screen for composing a text message or connect to the URL address in dependence on a default option selected by the user.

Referring to the second aspect of the invention, each contact may have an e-mail address and/or a URL address associated therewith in addition to the telephone number, and the short cut key is, preferably, operable to access a screen for composing a text message, access a screen for composing an e-mail message, or connecting to the URL address in dependence on a default option selected by the user.

Referring to the third aspect of the invention, each contact may have an e-mail address and/or a telephone number associated therewith in addition to the URL address, and the short cut key is, preferably, operable to connect to the URL address, access a screen for composing a text message or access a screen for composing an e-mail in dependence on a default option selected by the user.

Referring to the first aspect of the invention, each contact may have a telephone number and/or a URL address associated therewith in addition to an e-mail address, and the short cut key is, alternatively, operable to access a screen for composing an e-mail, access a screen for composing a text message or connect to the URL in dependence on the duration of time that the short cut key is depressed.

Referring to the second aspect of the invention, each contact may have an e-mail address and/or a URL address associated therewith in addition to a telephone number, and the short cut key is, alternatively, operable to access a screen for composing an e-mail, access a screen for composing a text message or connect to the URL in dependence on the duration of time that the short cut key is depressed.

Referring to the third aspect of the invention, each contact may have an e-mail address and a telephone number associated therewith in addition to a URL address, and the short cut key is alternatively, operable to access a screen for composing an e-mail, access a screen for composing a text message or connect to the URL in dependence on the duration of time that the short cut key is depressed.

Referring to the first aspect of the invention, each contact may have a telephone number and/or a URL address associated therewith in addition to an e-mail address, and, in an alternative embodiment, a different short cut key is operable to access a screen for composing an e-mail, access a screen for composing a text message and to connect to the URL address.

Referring to the second aspect of the invention, each contact may have an e-mail address and/or a URL address associated therewith in addition to a telephone number and, in an alternative embodiment, a different short cut key is operable to access a screen for composing an e-mail address, for composing a text message and for connecting to the URL address.

Referring to the third aspect of the invention, each contact may have an e-mail address and/or a telephone number associated therewith in addition to a URL address and, in an alternative embodiment, a different short cut key is operable to access a screen for composing an e-mail address, to access a screen for composing a text message and to connect to the URL address.

The present invention also provides a mobile telecommunications device configured to operate according to any of the methods of the invention.

The present invention also provides a computer program stored in a memory and configured to be run by a controller to perform the steps according to any of the methods of the invention.

DETAILED DESCRIPTION OF THE PREFERRED EMBODIMENTS

Figure 1:
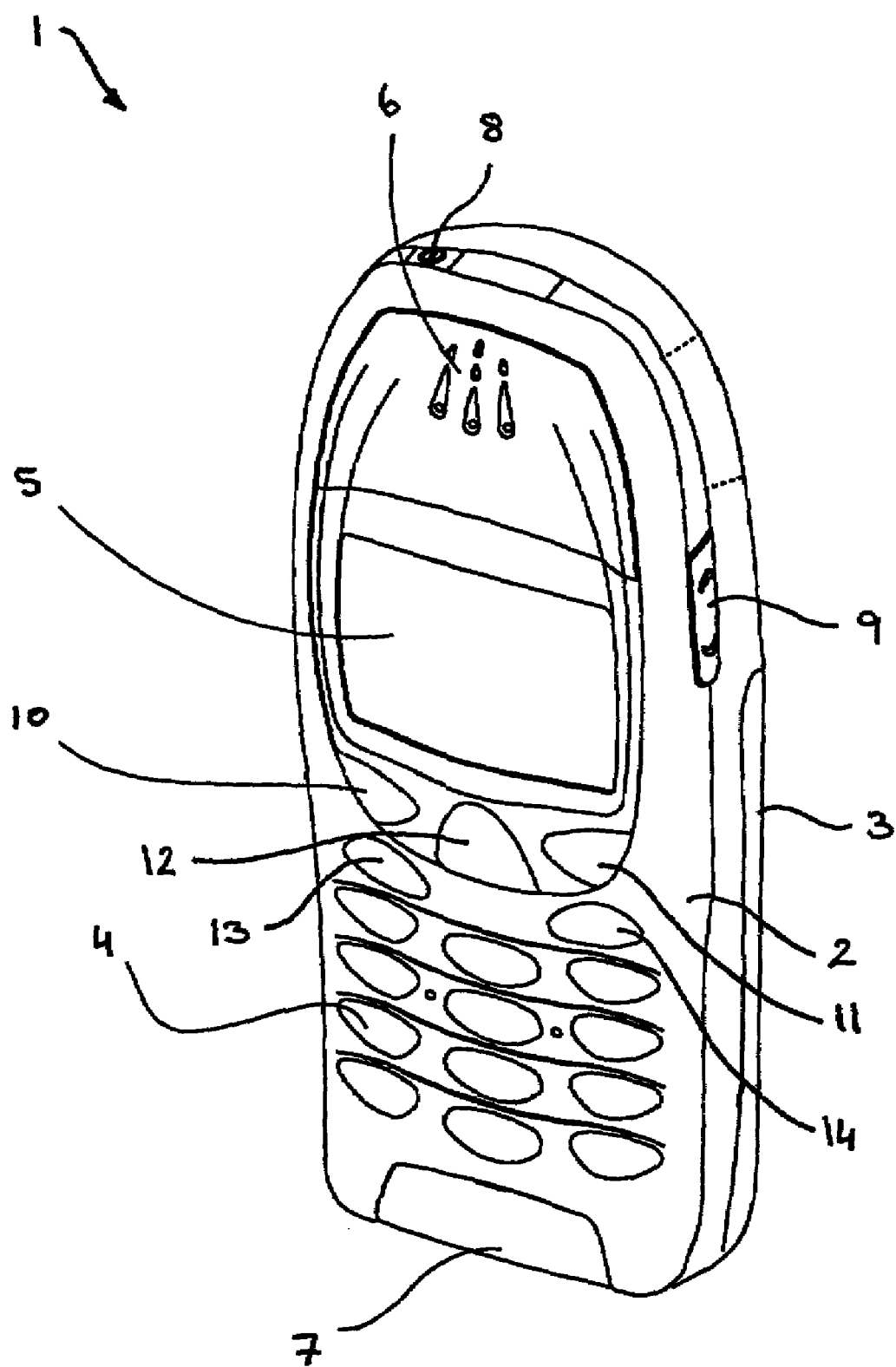
FIG. 1 illustrates a front perspective view of a mobile telephone for connection to a cellular or cordless network.

Embodiments of the present invention will now be described, by way of example only, with reference to the accompanying drawings.

The general components and operation of a mobile telephone 1 will now be described with reference to FIGS. 1 and 2. The telephone 1 has a front casing portion 2 and a rear casing portion 3. A user interface is provided in the front casing portion 2 and includes a display 5, an ear-piece 6, a microphone 7, and a control unit comprising an on/off key 8, a keypad 4 a scroll key 9. The telephone 1 is adapted for communication via a wireless telecommunications network, e.g. a cellular network. However, the telephone 1 could also have been designed for a cordless network. The keypad 4 has a first group of keys which are alphanumeric and by means of which a user can enter a telephone number, write a text message (SMS) or write a name associated with a particular number, etc.

The keypad 4 additionally includes three soft keys 10, 11,12 and two call handling keys 13,14. The first soft key 10 is an "End" key and is used for terminating or dropping calls. The second soft key 11 is an "Option" key and is used to call up menus from which the required function can be selected. The third soft key or middle soft key 12 is a selection key and its function changes depending on the status that the telephone is in and on what is shown on the display 5. The scroll key 9 is used for moving a highlight bar 28 (see below) over a particular item listed in a menu to enable it to be selected and performed or a sub-menu of options relating to that item to be displayed for subsequent highlighting and selection of a particular option. The call handling keys 13,14 are used for establishing a call or terminating or rejecting an answered or incoming call. Call handling key 13 is more commonly referred to as the "Send" key as it is used to initiate a call, send an e-mail or text message.

Figure 2:
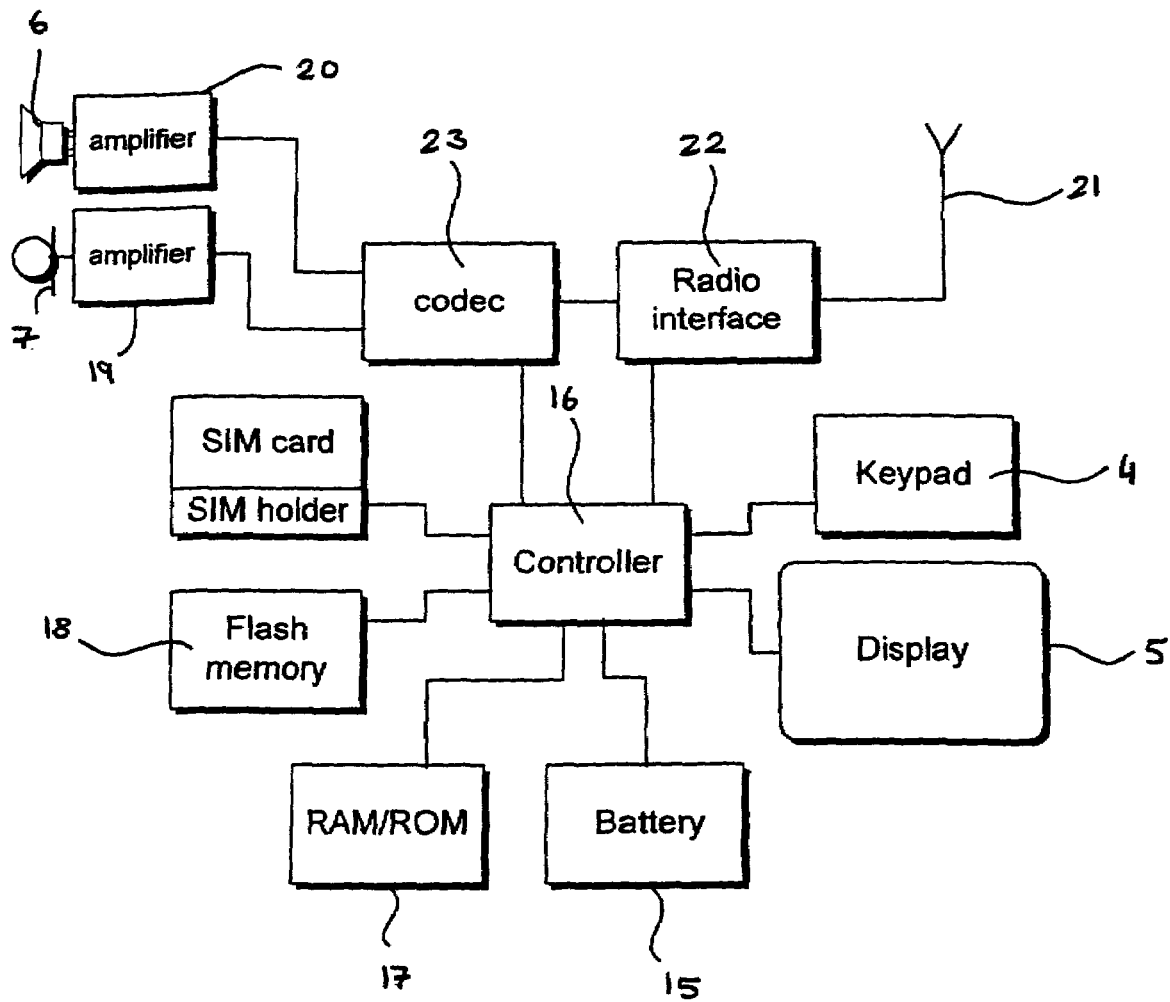
FIG. 2 illustrates a schematic representation of the main components of the mobile telephone illustrated in FIG. 1.

FIG. 2 illustrates the main parts of the telephone 1 which is adapted for use in connection with a GSM network or any other mobile telephone network and may also be configured to meet the wireless application protocol specification (WAP). The telephone 1 is driven by a removable battery pack 15. Signal processing is carried out under the control of a digital micro-controller 16 which has an associated RAM/ROM 17 and a flash memory 18. Electric analogue signals are produced by microphone 7 and amplified by pre-amplifier 19. Similarly, analogue audio signals are fed to ear piece 6 through amplifier 20. The micro controller 16 receives instruction signals from the keypad 4 including the soft keys 10,11,12 and the call handling keys 13,14 and controls the operation of the display 5. Radio signals are transmitted and received by means of an antenna 21 connected through an rf stage 22 to a codec 23 configured to process signals under the control of the micro-controller 16. Thus, in use, for speech, the codec 23 receives analogue signals from microphone amplifier 19, digitises them into a form suitable for transmission and feeds them to the rf stage 22 for transmission through antenna element 21 to the public land mobile network (PLMN). Similarly, received signals are fed to codec 23 so as to produce analogue signals fed to amplifier 20 and ear piece 6.

Figure 3A:
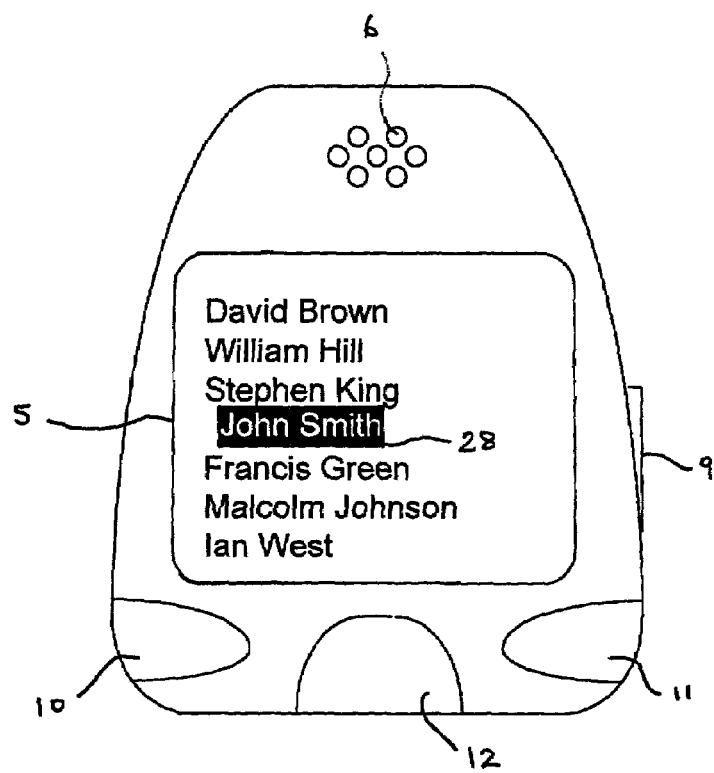
FIG. 3A illustrates a partial view of the front casing of a mobile telephone shown in FIG. 1 showing an address or contact list on the screen display.

Referring now to FIG. 3A, there is shown a partial view of the front face of the mobile telephone 1 illustrated in FIG. 1 in which only the display 5, the ear piece 6 the three soft keys 10,11,12 and the scroll key 9 are visible. An address or contact list of names stored in the memory 18 is illustrated on the display which may accessed by pressing one of the soft keys, for example, soft key 11. The user may select a particular contact from the contact list by activating the scroll key 9 to position the highlight bar 28 over a required contact. In FIG. 3A, the contact "John Smith" is shown highlighted by the highlight bar 28, i.e. the colour of the font and the background surrounding the name "John Smith" is reversed to enable the user to clearly distinguish it from the other names in the list. It will be appreciated that other means of displaying a selected contact may be used instead. For example, the selected contact may be displayed in bolder type than the other names in the list. Alternatively, the selected contact may be underlined.

Figure 3B:
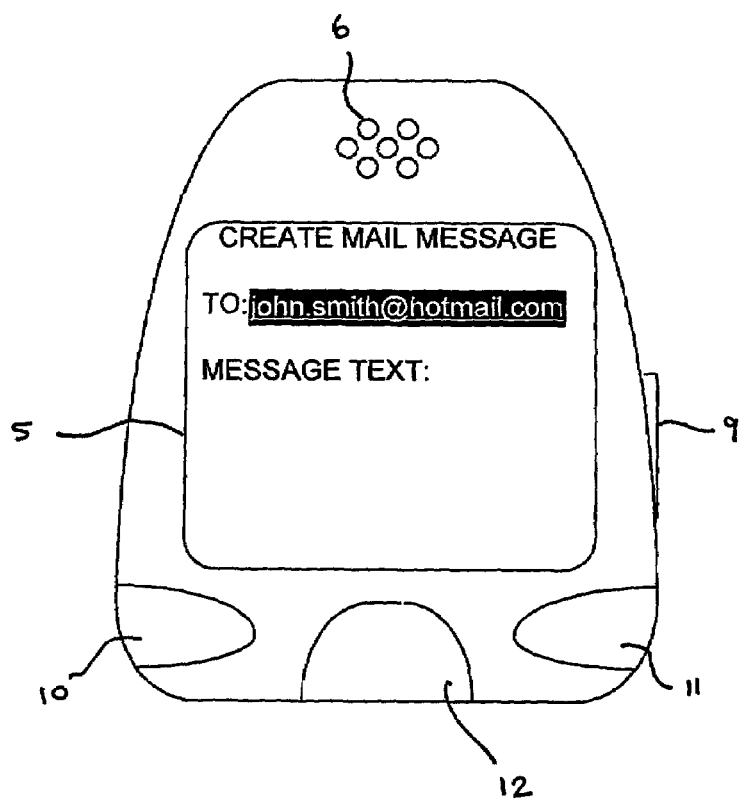
FIG. 3B illustrates the view of FIG. 3A following activation of the short cut key.

FIG. 3B shows the same view of the telephone 1 as FIG. 3A except that the short cut key has now been activated. In the present embodiment, the short cut key is the call handling key 13 (the "Send" key) shown in FIG. 1. However, it will be appreciated that the short cut key could also be any of the soft keys 10,11, 12 or any other key on the keypad 4. It can now be seen that the display 5 now shows a "create mail message" screen to enable the user to compose an e-mail message to the selected name in the contact list. The e-mail address of the selected contact has automatically been entered in the recipient address field on the "create e-mail message" screen, following the heading "To:" on the display 5. The user may therefore compose their message and press the short cut key 13 again to send it. In an alternative embodiment, an alternative key may be used to send the composed message, such as the soft key 12. Once the message has been sent, the address or contact list is displayed once again.

Figure 4A:
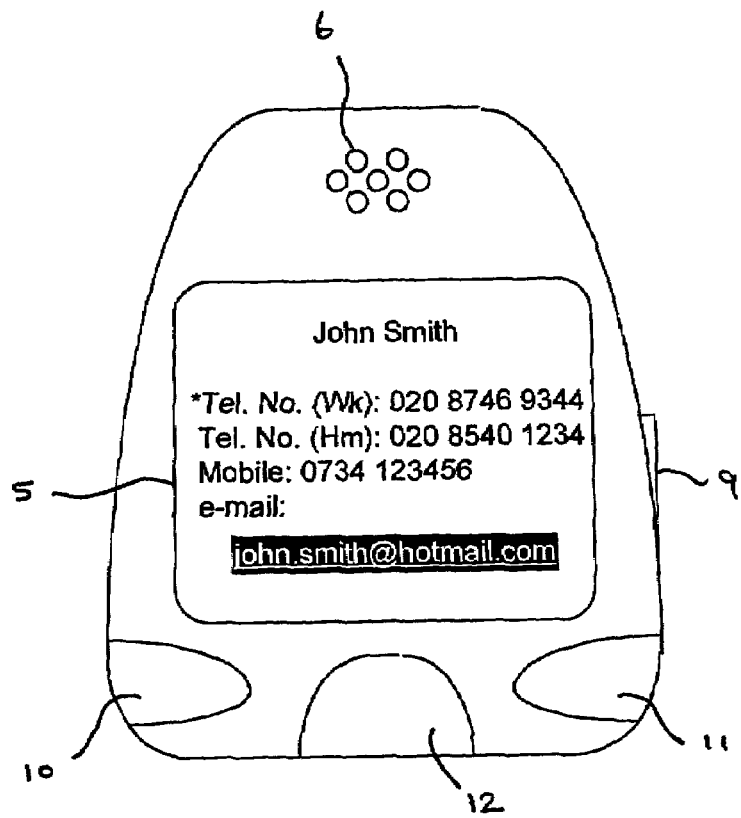
FIG. 4A illustrates the view of FIG. 3A following activation of the short cut key according to a second embodiment.
Figure 4B:
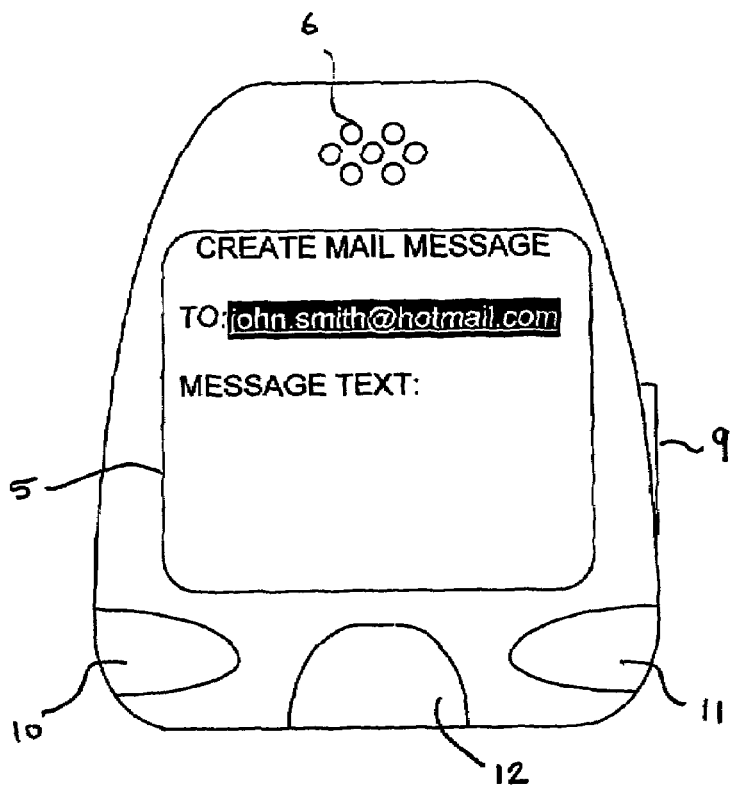
FIG. 4B illustrates the view of FIG. 4A following activation of the short cut key a second time after highlighting the e-mail address.

FIG. 4A shows an alternative embodiment showing the same view as the telephone shown in FIG. 3A following activation of the short cut key which again, in a preferred arrangement, is the call handling or "send" key 13. In this embodiment, the contact details of the selected contact which have been stored in the memory 18 are displayed on the screen. In the present embodiment, the contact telephone numbers of "John Smith" and his e-mail address are shown on the display 5. The user now scrolls through the list of contact details specific to "John Smith" using the scroll key 9 until the required telephone number or e-mail is highlighted. In FIG. 4A, the contact e-mail address for "John Smith" has been highlighted. When the short cut key 13 is subsequently pressed, the "Create e-mail message" window is displayed with the selected e-mail address entered in the recipient address field, as with the first embodiment illustrated in FIG. 3B. The user can then compose and send an e-mail message to the chosen recipient, as described above. Once the message has been sent, the screen display reverts back to the contact list.

It will be appreciated that the telephone is quicker and easier to operate when the "Create e-mail message" window is displayed immediately on activation of the short cut key, as described with reference to FIGS. 3A and 3B above, with the specific contact details screen not being displayed between the contact list and the "create e-mail message window". This may be achieved when, for example, the contact details stored in the memory 18 for a selected contact contain an e-mail address only. In this case, the "create e-mail message" window appears immediately on activation of the short cut key 13. If, however, the contact details list one or more telephone numbers as well as an e-mail address for the selected contact, the contact details screen will first be displayed, as shown in FIG. 4A, on activation of the short cut key, so that the user can select either a telephone number or the e-mail address of the selected contact, the "create mail" window being displayed only when the e-mail address is selected and the short cut key is pressed again. Alternatively, the telephone number of the selected contact is dialled when the short cut key is pressed when the telephone number is highlighted.

The display of the contact details screen for a selected contact can be avoided if the telephone is provided with a default programming option. For example, if the short cut key is programmed with the e-mail address as the default option, the create e-mail message window will always be displayed in response to activation of the short cut key, irrespective of any other contact details in the contact details list. The selected default may be indicated in some way on the specific details screen. For example, in FIG. 4A, the work telephone number of "John Smith" is shown with an asterisk "*" beside it. This indicates to the user that this telephone number has been programmed as the default option so that a call to this number will be made on activation of the short cut key.

In an alternative arrangement, different short cut keys can be assigned to different methods of initiating contact so that the telephone number of the selected contact is dialled or the "create e-mail message" window is displayed depending on the short cut key activated, the user pressing the appropriate short cut key depending on the method they wish to use to contact the selected person in their address list.

In yet another alternative arrangement, the function of the short cut key can depend on the duration of time that the key is pressed. For example, a key press of a relatively short duration may display the "create e-mail" message window whereas if the key is held for longer in a depressed state, a call may be initiated to the telephone number of the selected contact stored in the memory.

In a preferred embodiment, the "create mail message" window is displayed when there is an e-mail address but no contact telephone number entered under the contact details for a selected contact and the short cut key is pressed, the detailed contact information screen is displayed for a selected contact when a telephone number and an e-mail address is entered under the contact details for a selected contact and the short cut key is pressed, the "create e-mail message" window being displayed when the e-mail address shown in the contact details screen is highlighted and the short cut key is pressed again, and a call is initiated to the telephone number when a telephone number but no e-mail address is entered under the contact details for a selected contact and the short cut key is pressed.

Figure 5:
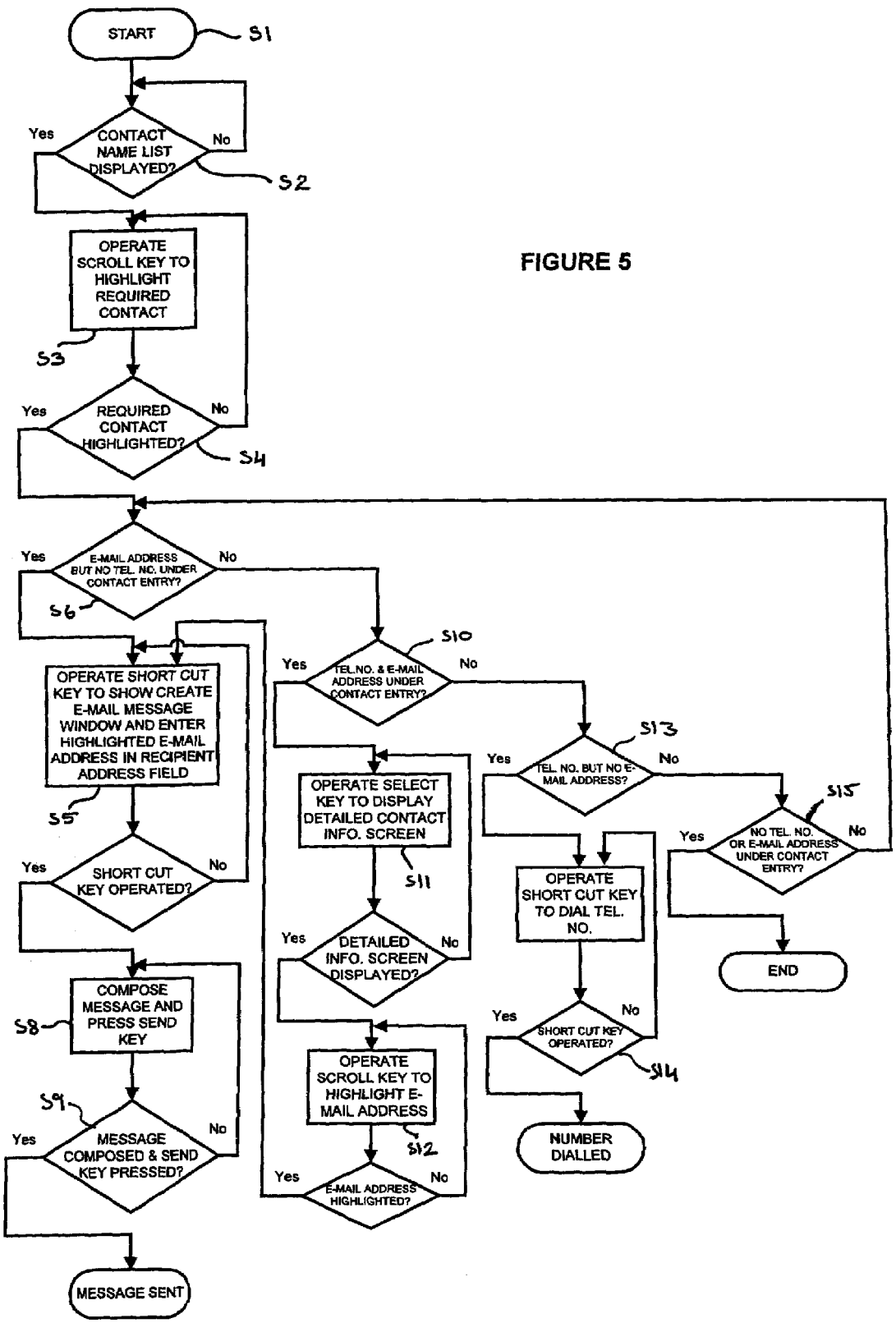
FIG. 5 illustrates a flow chart to show the sequence of steps involved according to one preferred embodiment of the invention.

The foregoing sequence is displayed graphically in the flow chart of FIG. 5. In Step S1, the procedure starts and waits for the contact name list (as shown in FIG. 3A) to be displayed (Step S2). Once the list has been displayed, the user operates the scroll key 9 to select a chosen contact ("John Smith" in FIG. 3A) (Step S3). When the chosen contact has been highlighted (Step S4), the "create e-mail message" window is displayed on activation of the short cut key (Step S5) with the e-mail address automatically entered in the recipient address field, when the contact details for the selected contact includes an e-mail address but no telephone number (Step S6). The user can them proceed to compose an e-mail message and send it (Step S8 and S9). However, if there is a telephone number and an e-mail address entered under the contact details for a selected contact (Step S10), activation of the short cut key 13 displays the detailed contact information screen relating to that contact (Step S11). When the detailed screen is displayed, the user operates the scroll key 9 to highlight the e-mail address (Step S12), Steps S5, S8 and S9 are then is performed as described above. If, instead of the e-mail address, a telephone number is highlighted and the short cut key pressed, a call to that telephone number is initiated. If there is a telephone number but no e-mail address entered under the contact details for a selected contact (Step S13), activation of the short cut key initiates a call to that telephone number (Step S14). If there is no telephone number or e-mail address entered under a selected contact (Step S15), nothing happens when the short cut key is pressed. Alternatively, a window may appear prompting the user to enter contact details for the selected contact in the memory.

Although the invention has been described with reference to contacting a selected contact via e-mail or by dialling their telephone number, it will be appreciated that the invention may also include contacting a selected contact via text message (SMS), in which case the "create e-mail message" window is replaced with a "create text message" window having a recipient telephone number and/or name field, the relevant information being entered in this field on activation of the short cut key.

The invention may also apply to connecting to a URL website address, or the imode browser application in the case of Japanese telephones. For example, if a URL address has been entered under the contact details for a selected contact, activation of the short cut key may initiate a connection to that URL. Alternatively, the detailed contact information for the selected contact may be displayed, a connection to the URL being achieved by highlighting the URL and pressing the short cut key once again.

Many modifications and variations of the invention falling within the terms of the appended claims will be apparent to those skilled in the art and the foregoing description should be regarded as a description of the preferred embodiments only.

The invention claimed is:

1. A method comprising:
   displaying a list of contacts stored in a memory of a mobile phone, each contact in the list of contacts having at least one e-mail address field configured to store an associated e-mail address and at least one telephone number field configured to store an associated telephone number;
   receiving a highlighted contact from the displayed list on a user interface having a scroll key;
   receiving a short cut key activation from the user interface for the highlighted contact;
   if the activated highlighted contact includes at least one associated e-mail address in the e-mail address field and at least one telephone number in the telephone number field, displaying contact details upon the short cut key activation;
   if the activated highlighted contact includes at least one associated e-mail address in the e-mail address field and does not include a telephone number in the telephone number field, displaying a screen for composing an e-mail upon the short cut key activation, the selected at least one e-mail address entered into a recipient address field; and
   if the activated highlighted contact includes at least one associated telephone number in the telephone number field and does not include an e-mail address in the e-mail address field, initiating a telephone call upon the short cut key activation.

2. The method of claim 1 wherein the short cut key activation comprises a soft key activation.

3. The method of claim 1 wherein the short cut key activation comprises a call handling key activation.

4. The method of claim 1 wherein each contact in the list of contacts has at least one URL address field configured to store an associated URL address, further comprising:
   if the activated highlighted contact includes at least one associated URL address in the URL address field, and does not include an e-mail address in the e-mail address field or a telephone number in the telephone number field, connecting to the URL upon receipt of the short cut key activation.

5. A mobile phone comprising:

a user interface including at least one key;

a memory; and a processor coupled to the memory and programmed with computer-executable instructions configured to:

- display on the user interface a list of contacts stored in the memory of the mobile phone, each of the contacts in the list of contacts having at least one e-mail address field for storing an associated e-mail address and at least one telephone number field for storing an associated phone number;
- receive a contact selected from the list of contacts;
- receive a key activation for the selected contact;
- if the activated selected contact includes at least one associated e-mail address in the e-mail address field and at least one telephone number in the telephone number field, display contact details upon the key activation;
- if the activated selected contact includes at least one associated e-mail address in the e-mail address field and does not include a telephone number in the telephone number field, display a screen for composing an e-mail upon the key activation, the selected at least one e-mail address entered into a recipient address field; and
- if the activated selected contact includes at least one associated telephone number in the telephone number field and does not include an e-mail address in the e-mail address field, initiate a telephone call upon the key activation.

6. The mobile phone of claim 5 further comprising:

the user interface including at least two keys;

the processor coupled to the memory and programmed with computer-executable instructions further configured to:

- display a screen to compose a text message upon activation of a key; and
- if the activated selected contact includes at least one telephone number in the telephone number field, automatically entering the telephone number into a recipient address field of the displayed compose text message screen.

\* \* \* \* \*